(12) United States Patent
Dietrich et al.

(10) Patent No.: US 10,525,344 B2
(45) Date of Patent: *Jan. 7, 2020

(54) SYSTEM AND METHOD FOR IMPROVING THE GRAPHICS PERFORMANCE OF HOSTED APPLICATIONS

(71) Applicant: Sony Interactive Entertainment America LLC, San Mateo, CA (US)

(72) Inventors: Douglas Sim Dietrich, Los Gatos, CA (US); Nico Benitez, San Francisco, CA (US); Timothy Cotter, Sunnyvale, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/162,328

(22) Filed: Oct. 16, 2018

(65) Prior Publication Data

US 2019/0046876 A1    Feb. 14, 2019

Related U.S. Application Data

(63) Continuation of application No. 15/269,968, filed on Sep. 19, 2016, now Pat. No. 10,099,129, which is a (Continued)

(51) Int. Cl.
*A63F 13/358* (2014.01)
*A63F 13/25* (2014.01)
(Continued)

(52) U.S. Cl.
CPC ............ *A63F 13/358* (2014.09); *A63F 13/20* (2014.09); *A63F 13/25* (2014.09); *A63F 13/335* (2014.09); *A63F 13/352* (2014.09);

*A63F 13/355* (2014.09); *H04H 60/32* (2013.01); *H04L 65/403* (2013.01); *H04L 65/4076* (2013.01); *H04L 65/601* (2013.01); *H04L 65/605* (2013.01); *H04L 67/38* (2013.01); *H04N 19/436* (2014.11); *H04N 19/61* (2014.11); *H04N 21/233* (2013.01); *H04N 21/2343* (2013.01);
(Continued)

(58) Field of Classification Search
CPC .......... A63F 13/12; A63F 13/20; A63F 13/25; A63F 13/335; H04N 19/146
See application file for complete search history.

(56) References Cited

U.S. PATENT DOCUMENTS

| 5,185,599 | A | * | 2/1993 | Doornink | ................. G09G 5/20 345/443 |
| 5,642,171 | A | * | 6/1997 | Baumgartner | ......... G11B 27/10 348/515 |
| 2007/0165035 | A1 | * | 7/2007 | Duluk, Jr. | ................. G06T 1/60 345/506 |

* cited by examiner

*Primary Examiner* — David Duffy
*Assistant Examiner* — Ankit B Doshi
(74) *Attorney, Agent, or Firm* — Penilla IP, APC

(57) ABSTRACT

One or more hardware components identify a bottleneck stage within a processor pipeline that processes frames of a video stream. The bottleneck stage has a first clock. An upstream stage receives a feedback signal from the bottleneck stage. The upstream stage has a second clock and the feedback signal includes information as to time required by the bottleneck stage to operate on data and information as to time the data spent queued. The upstream stage adjusts the speed at which the upstream stage operates and queues data to approximate the speed at which the bottleneck stage is operating and queuing data.

18 Claims, 13 Drawing Sheets

Related U.S. Application Data continuation of application No. 13/430,269, filed on Mar. 26, 2012, now Pat. No. 9,446,305, which is a continuation-in-part of application No. 12/538,077, filed on Aug. 7, 2009, now Pat. No. 9,138,644.

(60) Provisional application No. 61/210,888, filed on Mar. 23, 2009.

(51) Int. Cl.

| | |
|---|---|
| A63F 13/335 | (2014.01) |
| A63F 13/20 | (2014.01) |
| H04N 19/426 | (2014.01) |
| A63F 13/355 | (2014.01) |
| H04N 21/242 | (2011.01) |
| H04N 21/24 | (2011.01) |
| H04H 60/32 | (2008.01) |
| H04N 19/436 | (2014.01) |
| H04N 19/61 | (2014.01) |
| H04L 29/06 | (2006.01) |
| H04N 21/6587 | (2011.01) |
| H04N 21/61 | (2011.01) |
| H04N 21/2381 | (2011.01) |
| H04N 21/2343 | (2011.01) |
| H04N 21/233 | (2011.01) |
| A63F 13/352 | (2014.01) |
| A63F 13/837 | (2014.01) |
| H04N 19/169 | (2014.01) |
| H04N 19/146 | (2014.01) |
| H04N 21/6405 | (2011.01) |
| H04N 21/478 | (2011.01) |
| H04H 20/42 | (2008.01) |
| H04N 19/50 | (2014.01) |
| H04N 19/172 | (2014.01) |
| H04N 19/132 | (2014.01) |
| H04N 19/23 | (2014.01) |
| H04N 19/33 | (2014.01) |

(52) U.S. Cl.
CPC ....... *H04N 21/2381* (2013.01); *H04N 21/242* (2013.01); *H04N 21/2405* (2013.01); *H04N 21/6125* (2013.01); *H04N 21/6587* (2013.01); *A63F 13/837* (2014.09); *A63F 2300/203* (2013.01); *A63F 2300/402* (2013.01); *A63F 2300/407* (2013.01); *A63F 2300/534* (2013.01); *A63F 2300/538* (2013.01); *A63F 2300/552* (2013.01); *A63F 2300/554* (2013.01); *A63F 2300/5553* (2013.01); *A63F 2300/572* (2013.01); *A63F 2300/577* (2013.01); *A63F 2300/636* (2013.01); *A63F 2300/69* (2013.01); *A63F 2300/8076* (2013.01); *H04H 20/42* (2013.01); *H04N 19/132* (2014.11); *H04N 19/146* (2014.11); *H04N 19/172* (2014.11); *H04N 19/188* (2014.11); *H04N 19/23* (2014.11); *H04N 19/33* (2014.11); *H04N 19/50* (2014.11); *H04N 21/4781* (2013.01); *H04N 21/6405* (2013.01)

SYSTEM AND METHOD FOR IMPROVING THE GRAPHICS PERFORMANCE OF HOSTED APPLICATIONS

This application is a continuation of U.S. patent application Ser. No. 15/269,968, filed Sep. 19, 2016 (U.S. Pat. No. 10,099,129, issued Oct. 16, 2018), and entitled "SYSTEM AND METHOD FOR IMPROVING THE GRAPHICS PERFORMANCE OF HOSTED APPLICATIONS", which is a continuation of U.S. patent application Ser. No. 13/430,269, filed Mar. 26, 2012 (U.S. Pat. No. 9,446,305, issued Sep. 20, 2016), entitled "SYSTEM AND METHOD FOR IMPROVING THE GRAPHICS PERFORMANCE OF HOSTED APPLICATIONS", which is a continuation-in-part (CIP) of U.S. patent application Ser. No. 12/538,077, filed Aug. 7, 2009 (U.S. Pat. No. 9,138,644, issued Sep. 22, 2015), entitled "SYSTEM AND METHOD FOR ACCELERATED MACHINE SWITCHING", which claims priority to U.S. Provisional Application Ser. No. 61/210,888, filed Mar. 23, 2009. The disclosures of all of the above-identified applications are incorporated herein by reference.

TECHNICAL FIELD

The present disclosure relates generally to the field of data processing systems and particularly to a system and method for improving the graphics performance of hosted applications.

BACKGROUND

For low latency applications such as video games, it is critical that graphics operations proceed as efficiently as possible. However, attempts to speed the graphics rendering process may result in undesirable visual artifacts such as "tearing" in which information from two or more different frames is shown on a display device in a single screen draw. The embodiments of the invention described below provide a variety of techniques for improving the efficiency of graphics rendering while at the same time reducing these undesirable visual artifacts.

BRIEF DESCRIPTION OF THE DRAWINGS

The present disclosure will be understood more fully from the detailed description that follows and from the accompanying drawings, which however, should not be taken to limit the disclosed subject matter to the specific embodiments shown, but are for explanation and understanding only.

DESCRIPTION OF EXAMPLE EMBODIMENTS

In the following description specific details are set forth, such as device types, system configurations, communication methods, etc., in order to provide a thorough understanding of the present disclosure. However, persons having ordinary skill in the relevant arts will appreciate that these specific details may not be needed to practice the embodiments described.

The assignee of the present application has developed an online video gaming and application hosting system. Certain embodiments of this system are described, for example, in U.S. patent application Ser. No. 12/538,077, filed Aug. 7, 2009, entitled SYSTEM AND METHOD FOR ACCELERATED MACHINE SWITCHING (hereinafter '077 application) which claims priority to U.S. Provisional Application Ser. No. 61/210,888, filed, Mar. 23, 2009, and is a continuation-in-part (CIP) application of Ser. No. 10/315,460 filed Dec. 10, 2002 entitled, "APPARATUS AND METHOD FOR WIRELESS VIDEO GAMING", which is assigned to the assignee of the present CIP application. These applications are sometimes referred to as the "co-pending applications" and are incorporated herein by reference. A brief description of certain pertinent aspects of the online video game and application hosting system described in the co-pending applications will now be provided, following by a detailed description of a virtualization and encryption system and method for hosting applications.

An Exemplary Online Video Game and Application Hosting System

Figure 1:
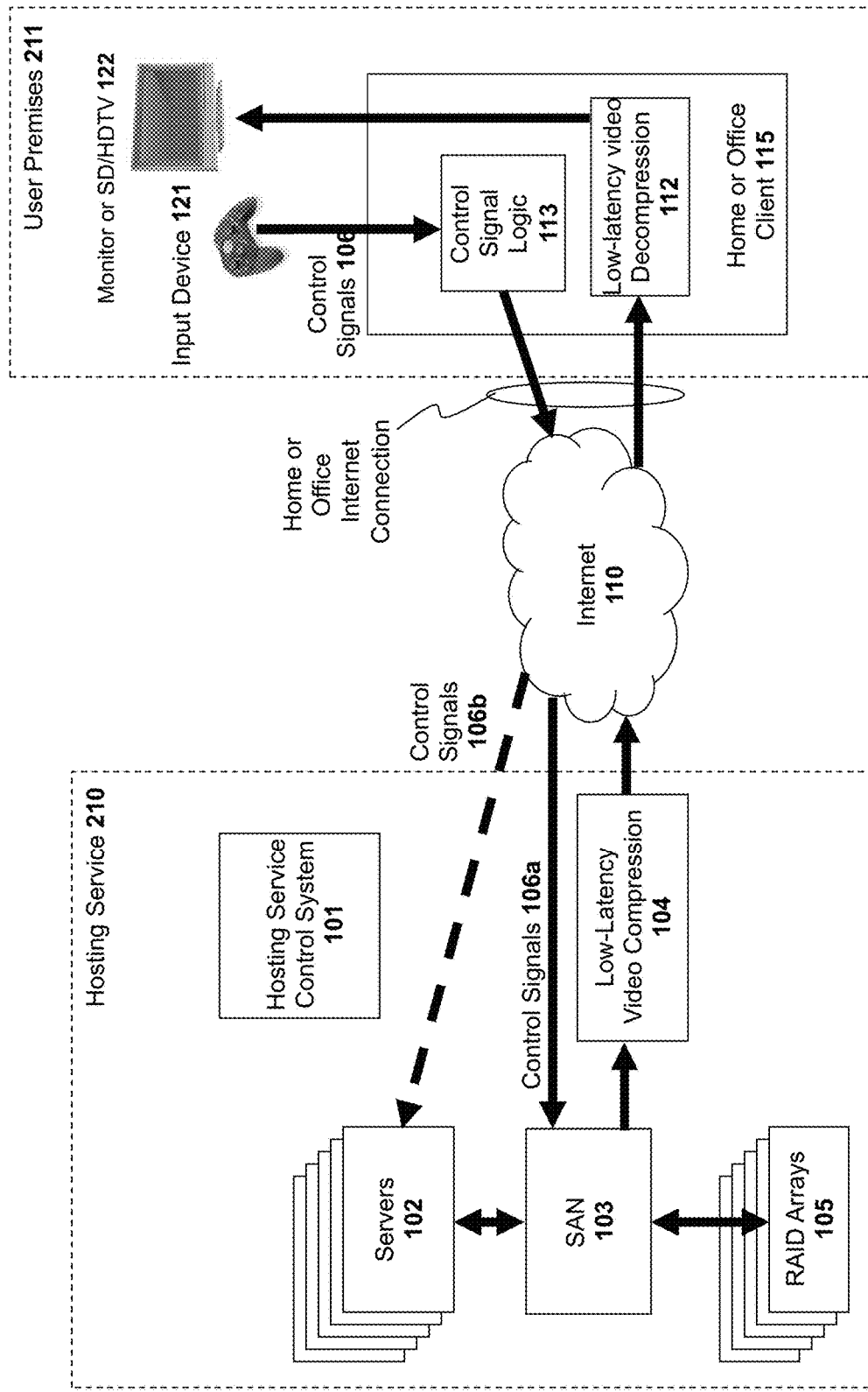
FIG. 1 illustrates a system architecture for executing online video games according to one embodiment of the invention.

FIG. 1 illustrates one embodiment of a video game/application hosting service 210 described in the co-pending applications. The Hosting Service 210 hosts applications running on Servers 102, that accept input from an Input device 121 received by Home or Office Client 115, and sent through the Internet 110 to the Hosting Service 210. The Servers 102 are responsive to the input, and update their video and audio output accordingly which is compressed through Low-Latency Video Compression 104. The compressed video is then streamed through the Internet 110 to be decompressed by the Home or Office Client 115, and then displayed on a monitor or SD/HDTV 122. This system is a low-latency streaming interactive video system as more thoroughly described in the aforementioned "co-pending applications."

Figure 2:
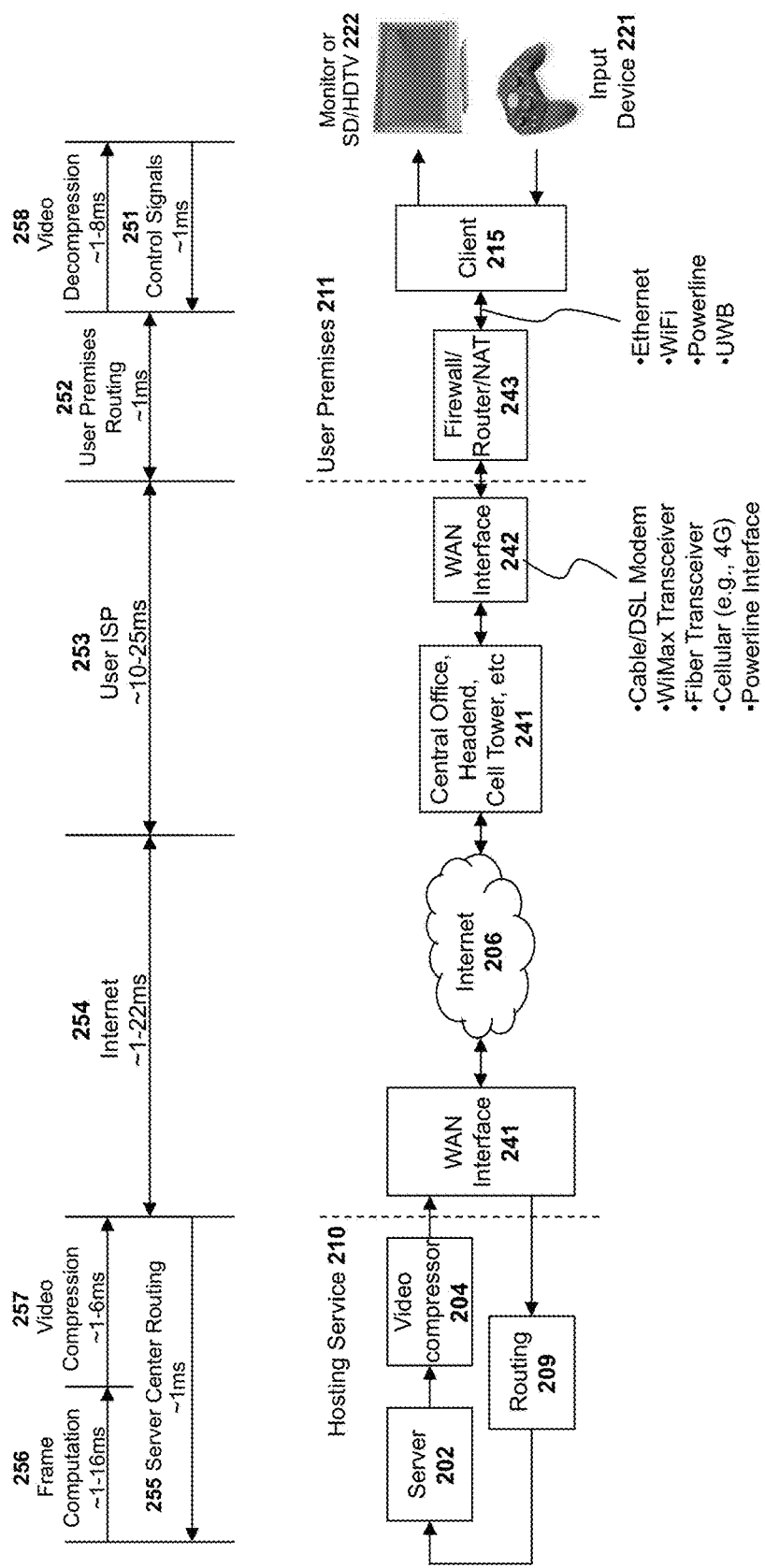
FIG. 2 illustrates different communication channels over which an online video game may be played in accordance with one embodiment of the invention.

As shown in FIG. 2, the network connection between the Hosting Service 210 and Home and Office Client 215 may be implemented through a wide range of network technologies, of varying degrees of reliability, such as wired or optical fiber technologies that are typically more reliable and wireless technologies that may be subject to unpredictable interference or range limitations (e.g. Wi-Fi) and are typically less reliable. Any of these client devices may have their own user input devices (e.g., keyboards, buttons, touch screens, track pads or inertial-sensing wands, video capture cameras and/or motion-tracking cameras, etc.), or they may use external input devices 221 (e.g., keyboards, mice, game controllers, inertial sensing wand, video capture cameras and/or motion tracking cameras, etc.), connected with wires or wirelessly. As described in greater detail below, the hosting service 210 includes servers of various levels of performance, including those with high-powered CPU/GPU processing capabilities. During playing of a game or use of an application on the hosting service 210, a home or office client device 215 receives keyboard and/or controller input from the user, and then it transmits the controller input through the Internet 206 to the hosting service 210 that executes the gaming program code in response and generates successive frames of video output (a sequence of video images) for the game or application software (e.g., if the user presses a button which would direct a character on the screen to move to the right, the game program would then create a sequence of video images showing the character moving to the right). This sequence of video images is then compressed using a low-latency video compressor, and the hosting service 210 then transmits the low-latency video stream through the Internet 206. The home or office client device then decodes the compressed video stream and renders the decompressed video images on a monitor or TV. Consequently, the computing and graphical hardware requirements of the client device 215 are significantly reduced. The client 215 only needs to have the processing power to forward the keyboard/controller input to the Internet 206 and decode and decompress a compressed video stream received from the Internet 206, which virtually any personal computer is capable of doing today in software on its CPU (e.g., a Intel Corporation Core Duo CPU running at approximately 2 GHz is capable of decompressing 720p HDTV encoded using compressors such as H.264 and Windows Media VC9). And, in the case of any client devices, dedicated chips can also perform video decompression for such standards in real-time at far lower cost and with far less power consumption than a general-purpose CPU such as would be required for a modern PC. Notably, to perform the function of forwarding controller input and decompressing video, home client devices 205 do not require any specialized graphics processing units (GPUs), optical drive or hard drives.

As games and applications software become more complex and more photo-realistic, they will require higher-performance CPUs, GPUs, more RAM, and larger and faster disk drives, and the computing power at the hosting service 210 may be continually upgraded, but the end user will not be required to update the home or office client platform 215 since its processing requirements will remain constant for a display resolution and frame rate with a given video decompression algorithm. Thus, the hardware limitations and compatibility issues seen today do not exist in the illustrated system.

Further, because the game and application software executes only in servers in the hosting service 210, there never is a copy of the game or application software (either in the form of optical media, or as downloaded software) in the user's home or office ("office" as used herein unless otherwise qualified shall include any non-residential setting, including, schoolrooms, for example). This significantly mitigates the likelihood of a game or application software being illegally copied (pirated), as well as mitigating the likelihood of a valuable database that might be use by a game or applications software being pirated, exploited or otherwise compromised. Indeed, if specialized servers are required (e.g., requiring very expensive, large or noisy equipment) to play the game or application software that are not practical for home or office use, then even if a pirated copy of the game or application software were obtained, it would not be operable in the home or office.

Figure 3:
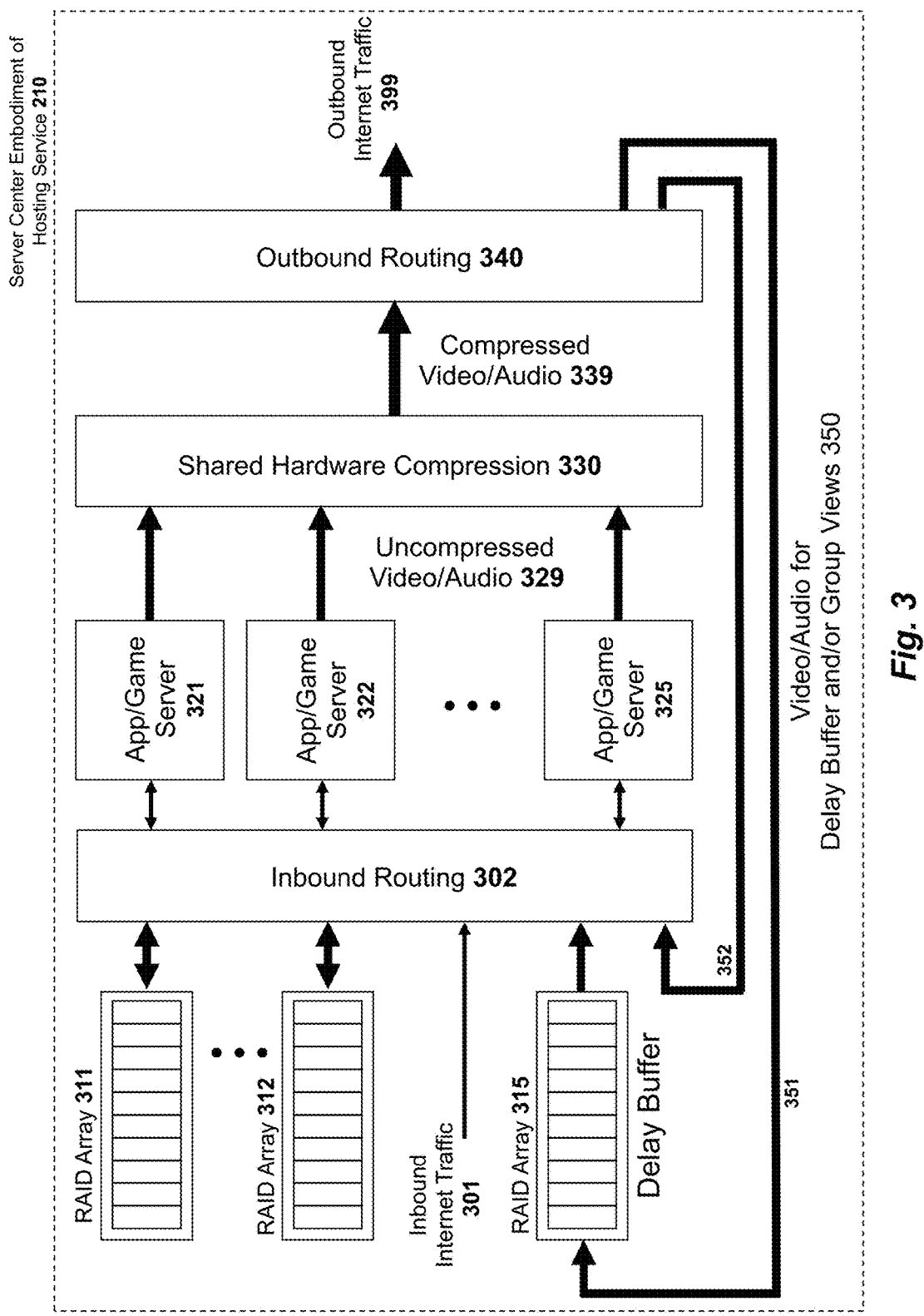
FIG. 3 illustrates one embodiment of a system architecture for compressing audio/video generated by a video game.

FIG. 3 illustrates an embodiment of components of a server center for hosting service 210 utilized in the following feature descriptions. As with the hosting service 210 illustrated in FIGS. 1-2, the components of this server center are controlled and coordinated by a hosting service 210 control system 101 unless otherwise qualified.

Inbound internet traffic 301 from user clients 215 is directed to inbound routing 302. Typically, inbound internet traffic 301 will enter the server center via a high-speed fiber optic connection to the Internet, but any network connection means of adequate bandwidth, reliability and low latency will suffice. Inbound routing 302 is a system of network (the network can be implemented as an Ethernet network, a fiber channel network, or through any other transport means) switches and routing servers supporting the switches which takes the arriving packets and routes each packet to the appropriate application/game ("app/game") server 321-325. In one embodiment, a packet which is delivered to a particular app/game server represents a subset of the data received from the client and/or may be translated/changed by other components (e.g., networking components such as gateways and routers) within the data center. In some cases, packets will be routed to more than one server 321-325 at a time, for example, if a game or application is running on multiple servers at once in parallel. RAID arrays 311-312 are connected to the inbound routing network 302, such that the app/game servers 321-325 can read and write to the RAID arrays 311-312. Further, a RAID array 315 (which may be implemented as multiple RAID arrays) is also connected to the inbound routing 302 and data from RAID array 315 can be read from app/game servers 321-325. The inbound routing 302 may be implemented in a wide range of prior art network architectures, including a tree structure of switches, with the inbound internet traffic 301 at its root; in a mesh structure interconnecting all of the various devices; or as an interconnected series of subnets, with concentrated traffic amongst intercommunicating device segregated from concentrated traffic amongst other devices. One type of network configuration is a SAN which, although typically used for storage devices, it can also be used for general high-speed data transfer among devices. Also, the app/game servers 321-325 may each have multiple network connections to the inbound routing 302. For example, a server 321-325 may have a network connection to a subnet attached to RAID Arrays 311-312 and another network connection to a subnet attached to other devices.

The app/game servers 321-325 may all be configured the same, some differently, or all differently, as previously described. In one embodiment, each user, when using the hosting service is typically using at least one app/game server 321-325. For the sake of simplicity of explanation, we shall assume a given user is using app/game server 321, but multiple servers could be used by one user, and multiple users could share a single app/game server 321-325. The user's control input, sent from client 215 as previously described is received as inbound Internet traffic 301, and is routed through inbound routing 302 to app/game server 321. App/game server 321 uses the user's control input as control input to the game or application running on the server, and computes the next frame of video and the audio associated with it. App/game server 321 then outputs the uncompressed video/audio 329 to shared video compression 330. App/game server may output the uncompressed video via any means, including one or more Gigabit Ethernet connections, but in one embodiment the video is output via a DVI connection and the audio and other compression and communication channel state information is output via a Universal Serial Bus (USB) connection.

The shared video compression 330 compresses the uncompressed video and audio from the app/game servers 321-325. The compression maybe implemented entirely in hardware, or in hardware running software. There may a dedicated compressor for each app/game server 321-325, or if the compressors are fast enough, a given compressor can be used to compress the video/audio from more than one app/game server 321-325. For example, at 60 fps a video frame time is 16.67 ms. If a compressor is able to compress a frame in 1 ms, then that compressor could be used to compress the video/audio from as many as 16 app/game servers 321-325 by taking input from one server after another, with the compressor saving the state of each video/ audio compression process and switching context as it cycles amongst the video/audio streams from the servers. This results in substantial cost savings in compression hardware. Since different servers will be completing frames at different times, in one embodiment, the compressor resources are in a shared pool 330 with shared storage means (e.g., RAM, Flash) for storing the state of each compression process, and when a server 321-325 frame is complete and ready to be compressed, a control means determines which compression resource is available at that time, provides the compression resource with the state of the server's compression process and the frame of uncompressed video/audio to compress.

Note that part of the state for each server's compression process includes information about the compression itself, such as the previous frame's decompressed frame buffer data which may be used as a reference for P tiles, the resolution of the video output; the quality of the compression; the tiling structure; the allocation of bits per tiles; the compression quality, the audio format (e.g., stereo, surround sound, Dolby® AC-3). But the compression process state also includes communication channel state information regarding the peak data rate and whether a previous frame is currently being output (and as result the current frame should be ignored), and potentially whether there are channel characteristics which should be considered in the compression, such as excessive packet loss, which affect decisions for the compression (e.g., in terms of the frequency of I tiles, etc.). As the peak data rate or other channel characteristics change over time, as determined by an app/game server 321-325 supporting each user monitoring data sent from the client 215, the app/game server 321-325 sends the relevant information to the shared hardware compression 330. These and other features of the hosting service 210 are described in detail the co-pending applications.

The shared hardware compression 330 also packetizes the compressed video/audio using means such as those previously described, and if appropriate, applying FEC codes, duplicating certain data, or taking other steps to as to adequately ensure the ability of the video/audio data stream to be received by the client 215 and decompressed with as high a quality and reliability as feasible.

Some applications, such as those described below, require the video/audio output of a given app/game server 321-325 to be available at multiple resolutions (or in other multiple formats) simultaneously. If the app/game server 321-325 so notifies the shared hardware compression 330 resource, then the uncompressed video/audio 329 of that app/game server 321-325 will be simultaneously compressed in different formats, different resolutions, and/or in different packet/error correction structures. In some cases, some compression resources can be shared amongst multiple compression processes compressing the same video/audio (e.g., in many compression algorithms, there is a step whereby the image is scaled to multiple sizes before applying compression. If different size images are required to be output, then this step can be used to serve several compression processes at once). In other cases, separate compression resources will be required for each format. In any case, the compressed video/audio 339 of all of the various resolutions and formats required for a given app/game server 321-325 (be it one or many) will be output at once to outbound routing 340. In one embodiment the output of the compressed video/audio 339 is in UDP format, so it is a unidirectional stream of packets.

The outbound routing network 340 comprises a series of routing servers and switches which direct each compressed video/audio stream to the intended user(s) or other destinations through outbound Internet traffic 399 interface (which typically would connect to a fiber interface to the Internet) and/or back to the delay buffer 315 (implemented as a RAID array in one embodiment), and/or back to the inbound routing 302, and/or out through a private network (not shown) for video distribution. Note that (as described below) the outbound routing 340 may output a given video/audio stream to multiple destinations at once. In one embodiment this is implemented using Internet Protocol (IP) multicast in which a given UDP stream intended to be streamed to multiple destinations at once is broadcasted, and the broadcast is repeated by the routing servers and switches in the outbound routing 340. The multiple destinations of the broadcast may be to multiple users' clients via the Internet, to multiple app/game servers 321-325 via inbound routing 302, and/or to one or more delay buffers 315. Thus, the output of a given server 321-322 is compressed into one or multiple formats, and each compressed stream is directed to one or multiple destinations.

Further, in another embodiment, if multiple app/game servers 321-325 are used simultaneously by one user (e.g., in a parallel processing configuration to create the 3D output of a complex scene) and each server is producing part of the resulting image, the video output of multiple servers 321-325 can be combined by the shared hardware compression 330 into a combined frame, and from that point forward it is handled as described above as if it came from a single app/game server 321-325.

Note that in one embodiment, a copy (in at least the resolution or higher of video viewed by the user) of all video generated by app/game servers 321-325 is recorded in delay buffer 315 for at least some number of minutes (15 minutes in one embodiment). This allows each user to "rewind" the video from each session in order to review previous work or exploits (in the case of a game). Thus, in one embodiment, each compressed video/audio output 339 stream being routed to a user client 215 is also being multicasted to a delay buffer 315. When the video/audio is stored on a delay buffer 315, a directory on the delay buffer 315 provides a cross reference between the network address of the app/game server 321-325 that is the source of the delayed video/audio and the location on the delay buffer 315 where the delayed video/audio can be found.

Graphics Processing in One Embodiment of an Online Game System

For low latency applications such as video games, it is critical that graphics operations proceed as efficiently as possible. However, attempts to speed the graphics rendering process may result in undesirable visual artifacts such as "tearing" in which information from two or more different frames is shown on a display device in a single screen draw. The embodiments of the invention described below provide a variety of techniques for improving the efficiency of graphics rendering while at the same time reducing these undesirable visual artifacts.

Figure 4:
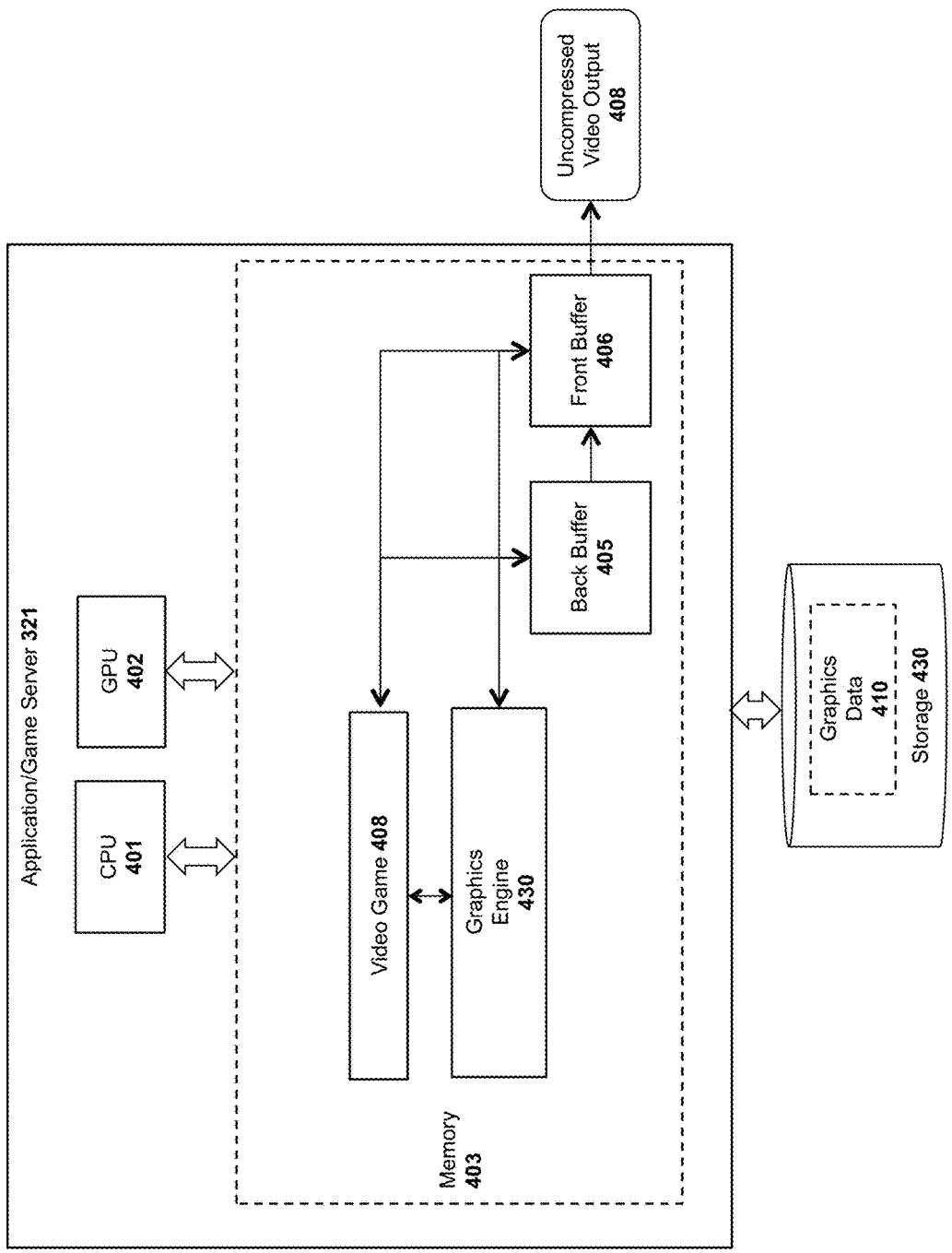
FIG. 4 illustrates a system architecture according to one embodiment of the invention.

As illustrated in FIG. 4, in one embodiment, each application/game server 321 is equipped with a central processing unit (CPU) 401 for executing video game program code 408 stored in memory 403 and a graphics processing unit (GPU) for executing graphics commands to render the video game output 408. The architectures of the CPU and GPU are well known and, as such, a detailed description of these units and the instructions/commands executed by these units will not be provided herein. Briefly, the GPU is capable of processing a library of graphics commands as specified by one or more graphics application programming interfaces (APIs) such as Open GL or Direct 3D. The program code for executing these graphics APIs is represented in FIG. 4 as graphics engine 430. As the CPU processes the video game program code 408 it hands off graphics commands specified by the API to the GPU which executes the commands and generates the video output 408. It should be noted, however, that the underlying principles of the invention are not limited to any particular graphics standard.

In one embodiment, both the CPU and GPU are pipelined processors, meaning that a set of data processing stages are connected in series within the CPU and GPU, so that the output of one stage is the input of the next one. By way of example, the CPU pipeline typically includes an instruction fetch stage, an instruction decode stage, an execution stage and a retirement stage, each of which may have multiple sub-stages. A GPU pipeline may have many more stages including, by way of example and not limitation, transformation, vertex lighting, viewing transformation, primitive generation, project transformation, clipping, viewport transformation, rasterization, texturing, fragment shading and display. These pipeline stages are well understood by one of ordinary skill in the art and will not be described in detail herein. The elements of a pipeline are often executed in parallel or in time-sliced fashion and some amount of queuing storage is often required between stages of the pipeline.

Each of the above stages and the queuing required between the stages adds a certain amount of latency to the execution of graphics commands. The embodiments of the invention below provide techniques for minimizing this latency. Reducing latency is important because it expands the markets in which a device can be used. Moreover, the manufacturer of a device may not have control over significant sources of latency. For example, a user may attach a high latency television to a video game console or a multimedia device may be used remotely (e.g., online video games, a medical device controlled over the internet or military devices engaging targets on the front line while the operator remains safely behind the lines).

As illustrated in FIG. 4, one embodiment of the invention includes a back buffer 405 and a front buffer 406 for storing video game image frames generated by the graphics engine 430 as the user plays a video game. Each "frame" is comprised of a set of pixel data representing one screen image of the video game. In operation, each frame is created in the back buffer as graphics commands are executed using graphics data. When a frame has been completed in the back buffer, it is transferred to the front buffer 406 from where it is scanned out line by line to create the uncompressed video output 408. The scan-out process may occur at a predetermined standard frequency (e.g., such as 60 Hz or 120 Hz as implemented on standard CRT or LCD monitors). The uncompressed video output 408 may then be compressed using the various advanced low latency video compression techniques described in the co-pending applications. Of course, the frame buffer doesn't need to be scanned out of the video card (e.g., via a digital video interface (DVI)) as implied above. It may be transferred directly to the compression hardware, for example over the application server's internal bus (e.g., a PCI Express bus). The frame buffer may be copied in memory either by one of the CPUs or GPUs. The compression hardware may be (by way of example and not limitation) the CPU, the GPU, hardware installed in the server, and/or hardware on the GPU card.

Figure 5:
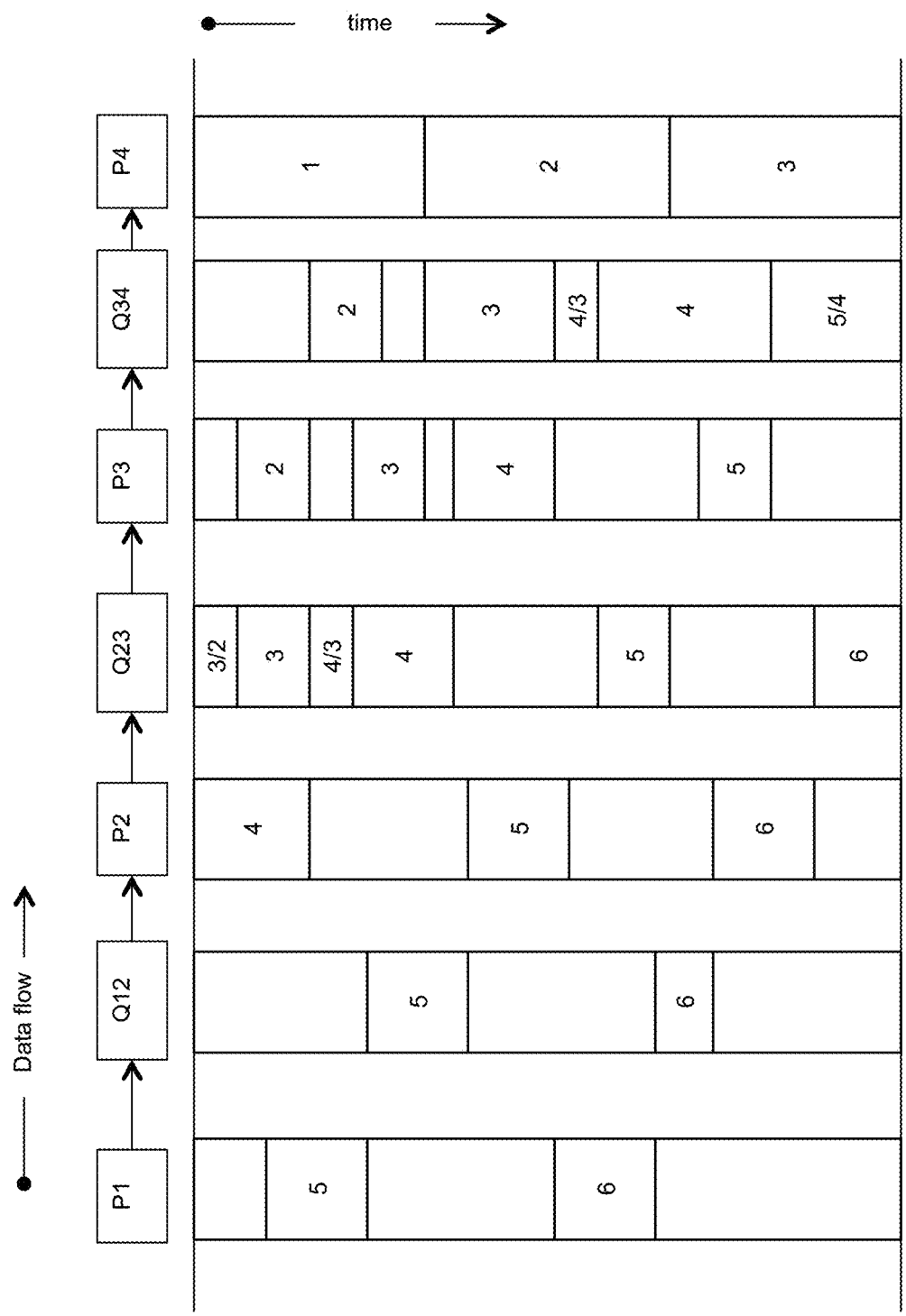
FIGS. 5-12 illustrate data flow between various system components and feedback employed in one embodiment of the invention.

FIG. 5 shows an asynchronous pipeline with queues (Q12, Q23, Q34) between each processing stage (P1, P2, P3, P4) to hold the data produced by the previous stage before it's consumed by the next stage. In one embodiment of the invention, the various stages described herein are stages within the GPU 402. The latency of such a pipeline is the sum of the time the data spends being transformed in each stage (Tp1, Tp2, Tp3) plus the time the data spends sitting in each queue (Tq1, Tq2, Tq3).

The obvious first step to minimizing latency is to minimize the queues or even get rid of them entirely. One common way to do this is to synchronize the pipeline stages as per FIG. 6. Every stage operates simultaneously on different sets of data. When all stages are ready, they all pass their data to the next stage in the pipeline. Queuing becomes trivial and will no longer be shown in the figures. Latency of a synchronized pipeline is the number of stages times the time for the slowest stage to complete.

Figure 7:
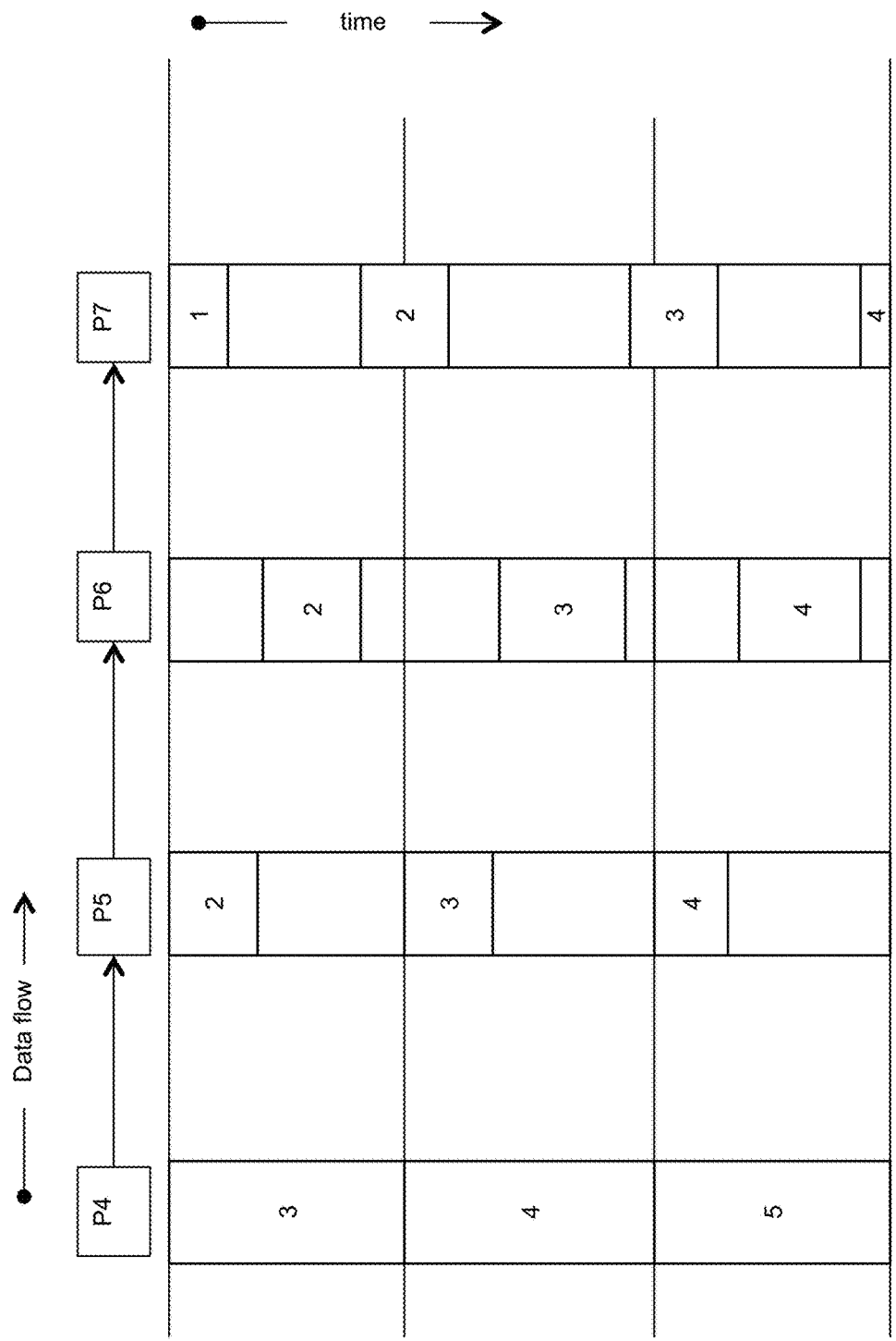

This slowest stage in the pipeline is the bottleneck, P4 in all figures. This stage is often a fixed feature of the device over which a designer has no control. FIG. 7 shows the dataflow downstream from the bottleneck stage. Notice there is no need for queuing or synchronization. Latency is the sum of the time it takes to complete each stage. Latency cannot be lower than this.

Figure 8:
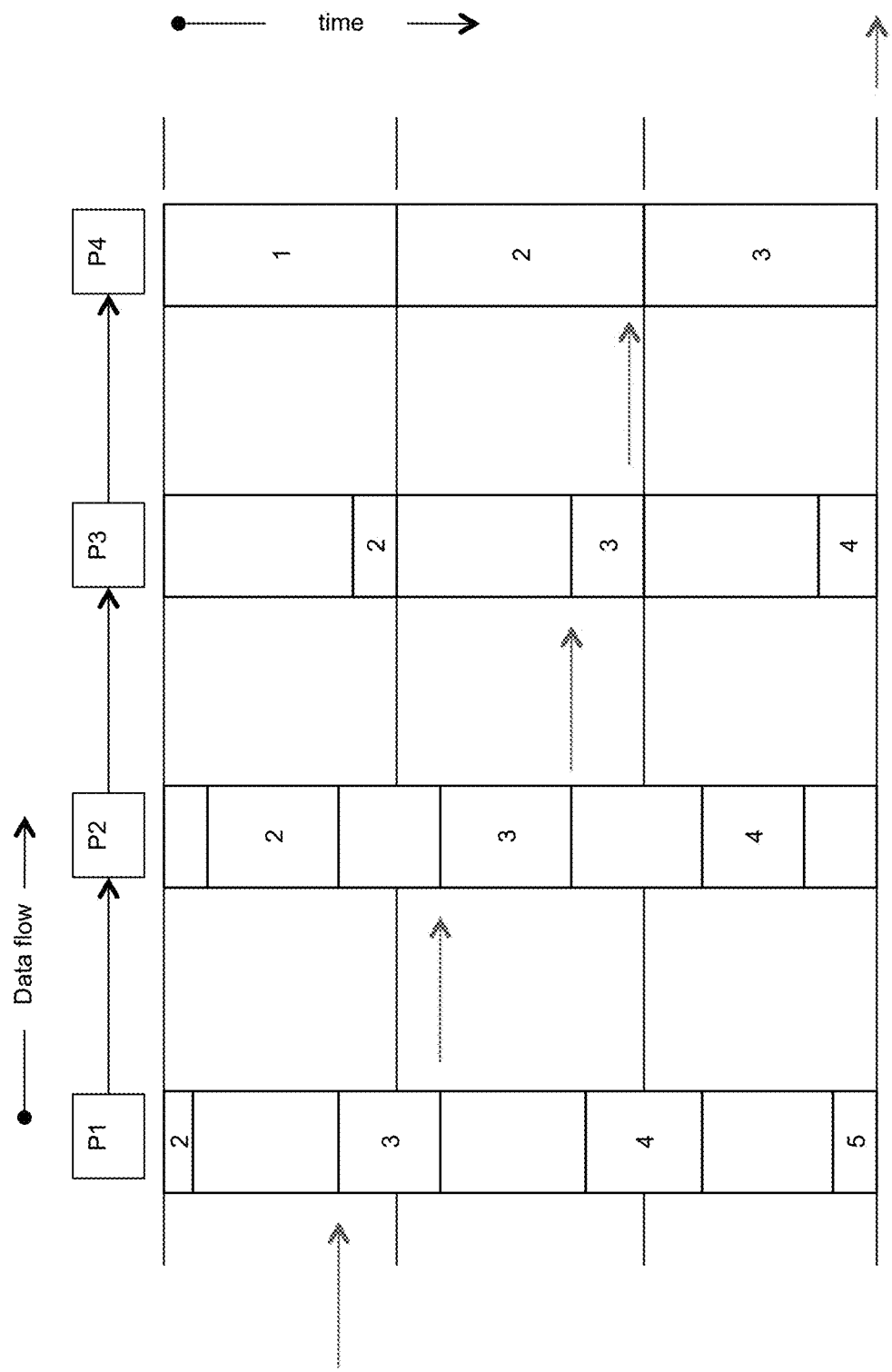

This inspires a method for minimizing the latency of pipeline stages upstream from the bottleneck as per FIG. 8. If the first pipeline stage knows exactly how long every pipeline stage will take and when the bottleneck stage will request new data, it can predict when to begin producing new data that will be ready just in time for the bottleneck stage. As such, in one embodiment, the first pipeline stage may throttle down its clock to slow down data processing based on when the new data will be needed by the bottleneck stage. This technique may be referred to as a phase locked pipeline. The total latency is the sum of the times for each pipeline stage.

Figure 9:
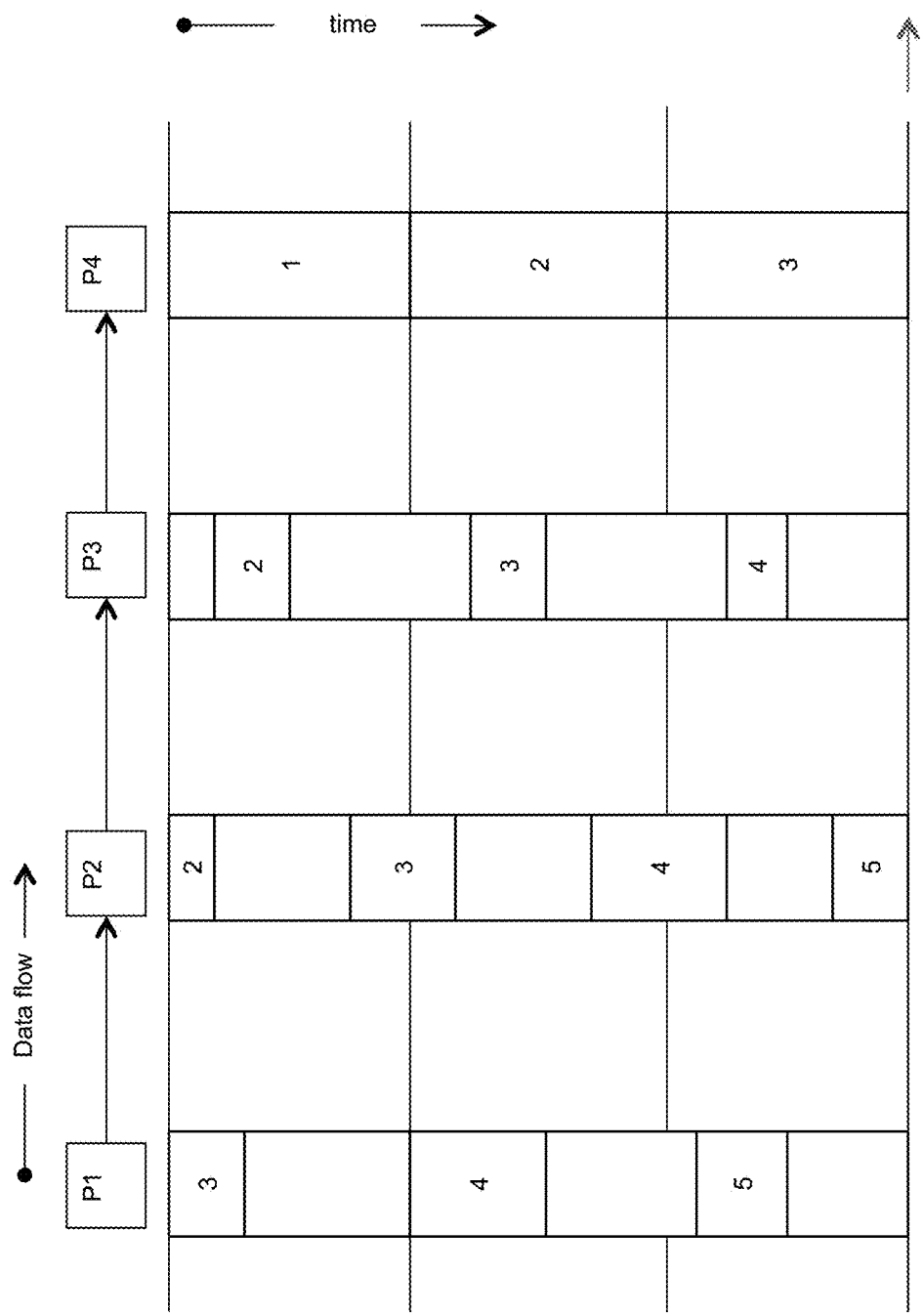

Another embodiment is illustrated in FIG. 9 in which the bottleneck stage is artificially moved to the first pipeline stage by slowing the first pipeline stage down to be slightly slower than the actual bottleneck stage. The box labeled 5 in P1 starts after box 3 in P4. Box 4 in P1 should also be slightly lower than the top of box 2 in P4. This is common practice in video games where the bottleneck stage is the physical connection between the computer and the monitor. One drawback in FIG. 9 is there must be some latency inducing queuing (not shown) between stages P3 and P4. Another drawback is that the latency experienced by the user may drift over time, decreasing steadily and then suddenly increasing only to begin decreasing again. It may also result in dropped frames. Developers often minimize dropped frames by driving the first stage at a rate as close to the bottleneck rate as possible. However, this rate is often not known exactly. If the first stage is driven even slightly faster than the bottleneck rate, the queues in the system will fill and stall the upstream stages. Ironically, attempting to minimize latency using this method risks maximizing it.

Figure 10:
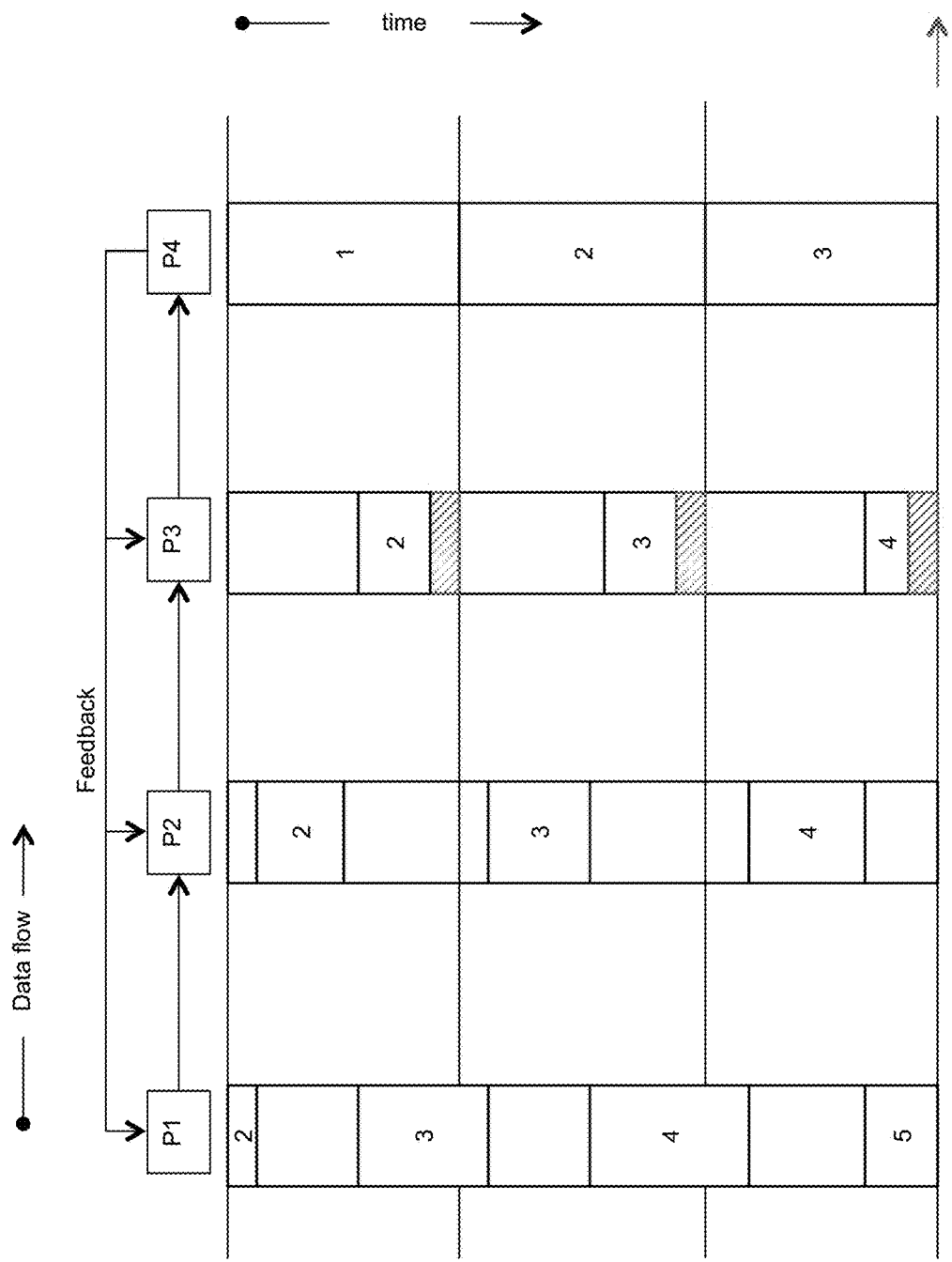

In one embodiment of the invention, shown in FIG. 10, the first stage is limited to be the same rate as the bottleneck stage. The tops of the numbered boxes in P1 should be the distance apart as the tops of the boxes in P4. The rates at which P1 is producing frames exactly matches the rate at which P4 is consuming them. Feedback is necessarily provided from the bottleneck stage to the first stage to ensure the rates match exactly. Every stage provides feedback including but not limited to the time required to operate on the data and time spent queued. The phase locking component maintains statistical information on each stage and can accurately predict with a predetermined confidence level that the data will be ready when the bottleneck stage requires it with a minimum amount of queuing. Note that a universal clock is not necessary in this embodiment. The phase locking component only requires relative times. As such, the pipeline stages may use different clocks. In fact, the clocks may be in separate physical devices that could potentially be thousands of miles apart. In summary, in this embodiment of the invention, a bottleneck phase is identified based on timing constraints. Feedback is then provided to upstream stages from the bottleneck phase to allow the upstream stages to match the bottleneck stage rate precisely. The phase of the upstream stages is adjusted to minimize time wasted in queues.

Figure 11:
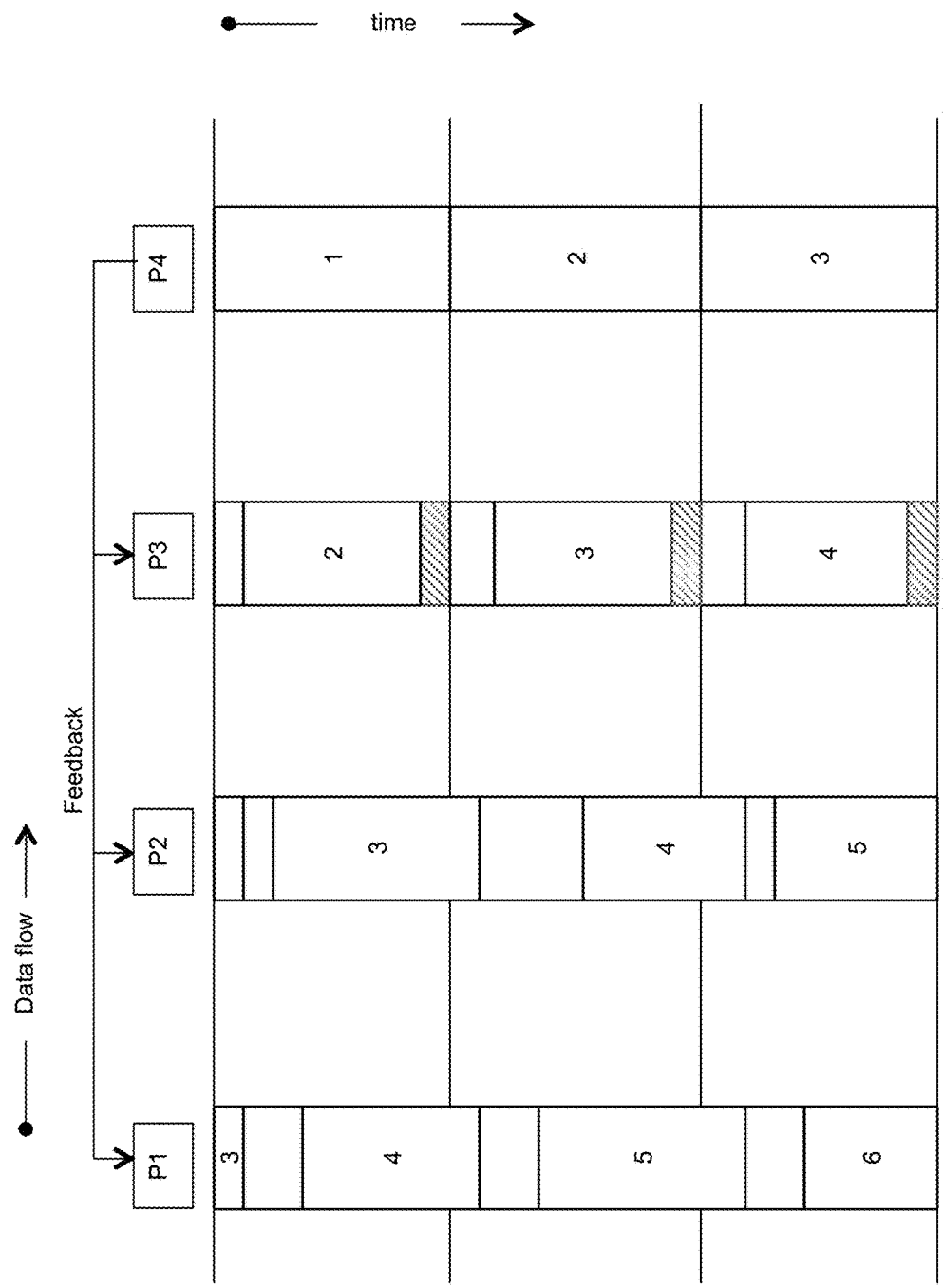

The preceding figures illustrated lightweight applications. These are inefficient because the hardware sits around idle most of the time. One embodiment of the invention which forms a less expensive design is one which dedicates the minimum hardware resources to each stage but still guarantees that each stage is faster than the bottleneck stage, as illustrated in FIG. 11. In this case, the phase locking method gains very little over a fully synchronized pipeline as per FIG. 6. Another example is computer games that render more polygons with higher resolution textures, more anti-aliasing, special effects until the frame rate starts to drop.

Figure 12:
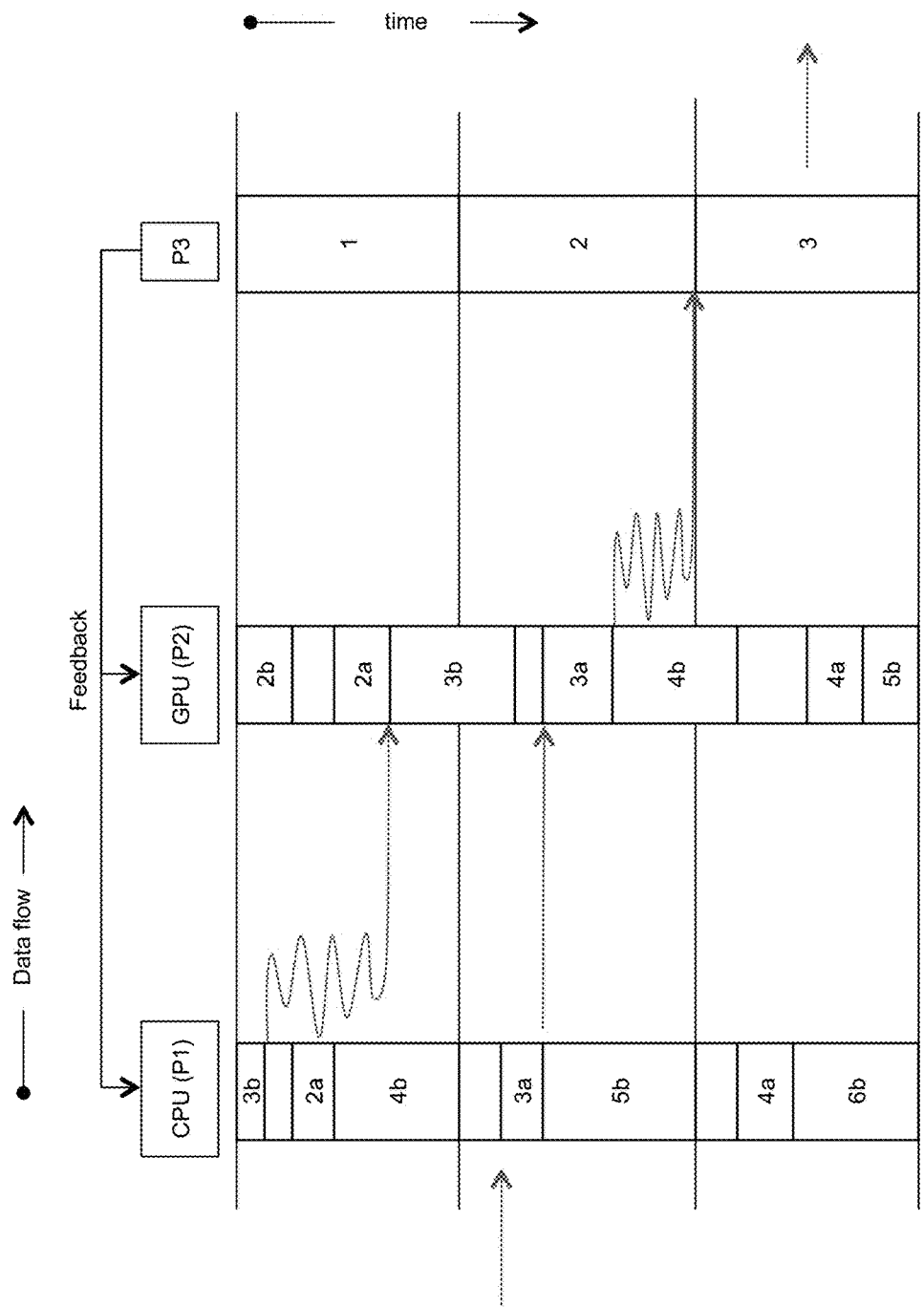

This embodiment leads directly to another embodiment of the invention in which advanced graphics is implemented using minimal hardware, but with low latency. In this embodiment, the video stream is subdivided into two logical parts which may be processed independently: (a) a resource light, latency critical part, and (b) a resource heavy, latency tolerant part. These two parts can be combined in a hybrid system as illustrated in FIG. 12. One specific example (of many possible) would be a computer game known as a "first person shooter" in which a user navigates around from the perspective of a game character in a 3-dimensional world. With this type of game, rendering the background and non-player characters is resource heavy and latency tolerant, denoted in FIG. 12 with a "b" for "background," while rendering the image of the player's character is made resource light and latency-intolerant (i.e., because anything less than very low latency performance will result in an undesirable user experience), denoted in FIG. 12 with an "a" for "avatar." When the user pulls the trigger, he expects to see his weapon to fire immediately. In the specific embodiment illustrated, the game is implemented on a personal computer with a central processing unit (CPU) as stage P1 and a graphics processing unit (GPU) as stage P2. The monitor, represented as P3, is the bottleneck stage. "Monitor," in the case, means any device that consumes the uncompressed video stream. Which could be the compressing hardware.

Figure 6:
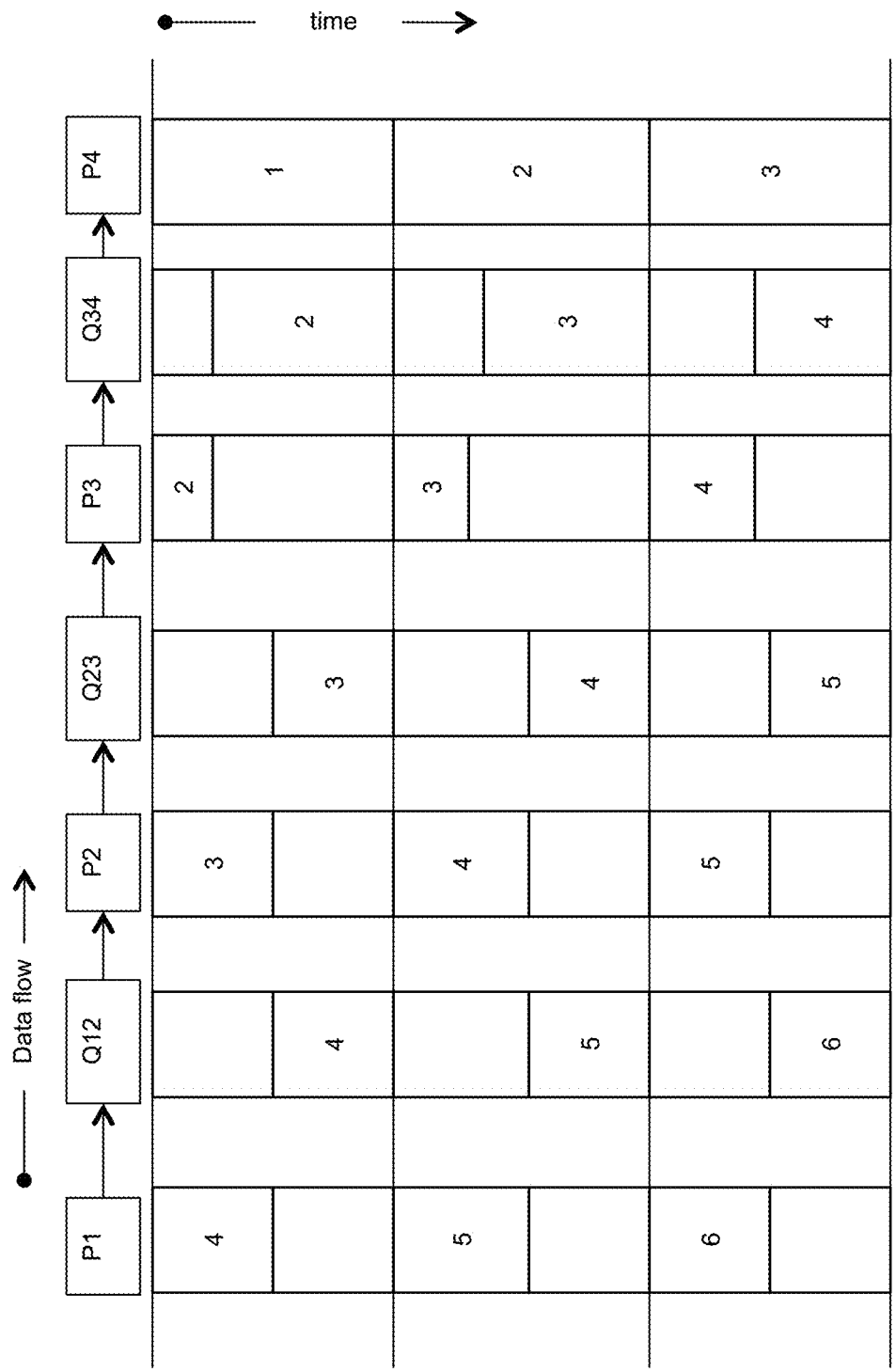

In this embodiment, the CPU completes its work on the background image, represented by 3b, before completing its work on avatar image, represented by 2a. Nonetheless, to reduce latency associated with the avatar, the GPU processes 2a ahead of 3b, rendering the avatar 2a on a previously rendered background 2b (to render the motion of the avatar as efficiently as possible) outputs that frame, and then immediately begins rendering the background of the next frame, represented by 3b. The GPU may sit idle for a short time waiting for data from the CPU to complete the next frame. In this embodiment, the CPU sits idle waiting for the phase lock to signal that it's time to make a list of drawing commands for the user's avatar and pass it on to the GPU. The CPU then immediately begins to draw the background of a new frame but it can't be the next frame because the GPU will start drawing the next frame. There's no way the CPU will have the next frame ready in time. Therefore, the CPU must start drawing the background for the frame after the next. This situation is similar to the operation of a synchronized pipeline as illustrated in FIG. 6.

Figure 13:
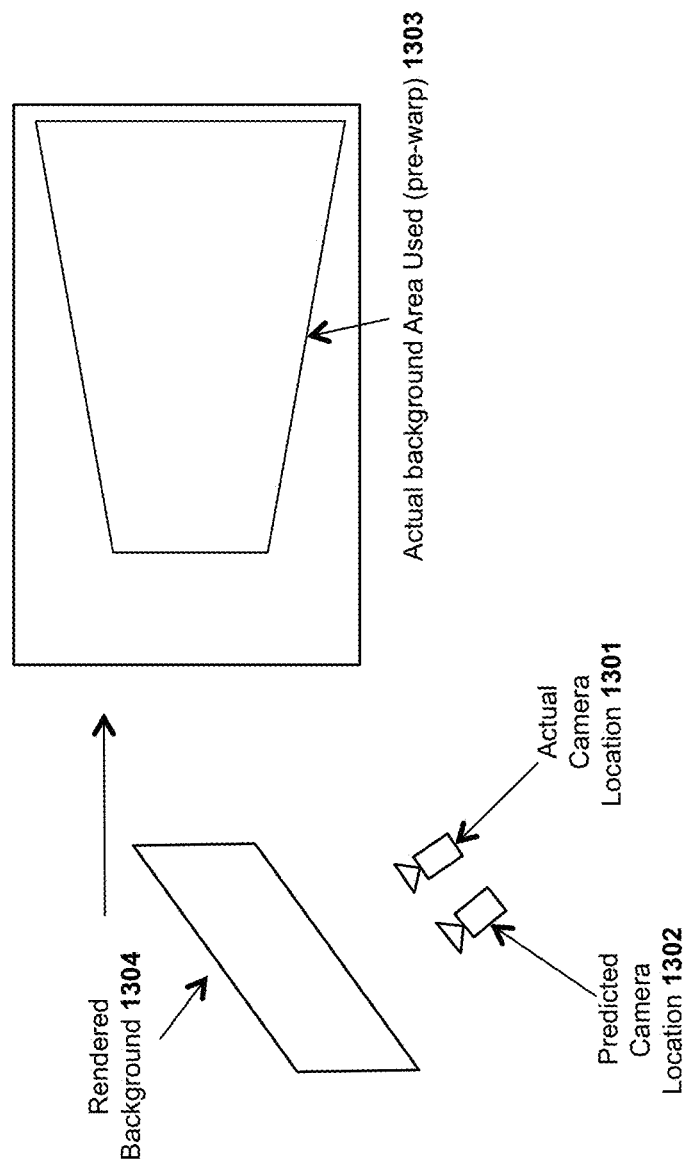
FIG. 13 illustrates distinctions between a predicted camera location and an actual camera location.

This one frame phase difference between the avatar and the background is, in most cases, acceptable to the user. However, in cases where highest possible quality is desired, the following additional techniques may be employed. The high latency path predicts the inputs to generate the data. In the first person shooter example, the location of the camera is predicted ahead of time. When the output of the high and low latency paths are combined, the output of the high latency path (e.g., the background) is modified to more closely match what would have been generated using the actual inputs instead of the predicted inputs. In the first person shooter example, the background would be translated, scaled, and/or rotated in order to match the actual camera position. Note this implies the high latency path would have to render an area somewhat larger than what is actually viewed by the player as illustrated in FIG. 13, which shows an actual camera location 1301, a predicted camera location 1302, an actual background 1303 and a rendered background 1304. Thus, if a user is playing a game in which a character is running at a tree, every frame the tree gets a little closer, meaning bigger. The user shoots a gun which hits the tree. In the hybrid scenario the tree is lagging behind the shot by one frame. So things might look "wrong" for a frame (i.e., the shot will look like it missed). To compensate, the described embodiments of the invention enlarge the tree to approximate what it would look like in the frame in which the shot was fired.

As another example, when a user is playing a first person shooter video game and pushes the fire button, the user wants to immediately see flames coming out of the gun. Thus, in one embodiment, the program draws the firing gun on top of a previously rendered background and the game times it so that the frame is done just in time to be picked up by the next stage in the pipeline (which is the dvi output (vsync) or the encoder input or some other bottleneck). Then the game draws its best guess at what the background should be for the next frame. If the guess is poor, then one embodiment modifies the background to more closely match what it would have been if the it had been rendered from the correct camera position. Thus, the technique shown in FIG. 13 is a simple affine warp. More sophisticated techniques employed in other embodiments use the z-buffer to do a better job.

In one embodiment, the various functional modules illustrated herein and the associated steps may be performed by specific hardware components that contain hardwired logic for performing the steps, such as an application-specific integrated circuit ("ASIC") or by any combination of programmed computer components and custom hardware components.

In one embodiment, the modules may be implemented on a programmable digital signal processor ("DSP") such as a Texas Instruments' TMS320x architecture (e.g., a TMS320C6000, TMS320C5000, . . . etc). Various different DSPs may be used while still complying with these underlying principles.

Embodiments may include various steps as set forth above. The steps may be embodied in machine-executable instructions which cause a general-purpose or special-purpose processor to perform certain steps. Various elements which are not relevant to these underlying principles such as computer memory, hard drive, input devices, have been left out of some or all of the figures to avoid obscuring the pertinent aspects.

Elements of the disclosed subject matter may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should also be understood that elements of the disclosed subject matter may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the disclosed subject matter may be downloaded as a computer program product, wherein the program may be transferred from a remote computer or electronic device to a requesting process by way of data signals embodied in a carrier wave or other propagation medium via a communication link (e.g., a modem or network connection).

Additionally, although the disclosed subject matter has been described in conjunction with specific embodiments, numerous modifications and alterations are well within the scope of the present disclosure. Accordingly, the specification and drawings are to be regarded in an illustrative rather than a restrictive sense.

What is claimed is:

1. A method, comprising operations of:
identifying a bottleneck stage within a processor pipeline processing frames of a video stream generated by program code of a video game being played by a user, the video game being executed by a server and said video stream is transmitted to a client computer, the bottleneck stage has a first clock;
receiving a feedback signal from the bottleneck stage at an upstream stage, wherein the upstream stage has a second clock and the feedback signal includes information as to time spent by the bottleneck stage operating on data and information as to time the data spent queued; and
adjusting a speed at which the upstream stage operates and queues data to approximate a speed at which the bottleneck stage is operating and queuing data, wherein each of the operations is performed by one or more hardware components of the server.

2. The method as in claim 1, wherein the processor pipeline includes one or more stages of central processor unit (CPU) processors and one or more stages of graphics processing unit (GPU) processors.

3. The method as in claim 2, wherein the one or more stages of CPU processors or the one or more stages of GPU processors are stages associated with the server, the server is defined by one or more servers, said servers being in a data center.

4. The method of claim 2, wherein queuing of storage between the one or more stages of CPU processors or the one or more stages of CPU processors adds an amount of latency to execution of graphics commands by CPU processors and GPU processors of the processor pipeline.

5. The method of claim 1, wherein the first clock is in a first device and wherein the second clock is in a second device.

6. The method of claim 5, wherein the first device and the second device are in different geographic locations associated with different data centers or in a same geographic location of a data center.

7. The method of claim 1, wherein the processor pipeline includes one or more stages of central processor unit (CPU) processors and one or more stages of graphics processing unit (GPU) processors, and each of the CPU processors and GPU processors is defined by processing hardware.

8. The method of claim 1,
wherein the processor pipeline includes a CPU pipeline that includes at least an instruction fetch stage, and an execution stage;
wherein the processor pipeline includes a GPU pipeline that includes at least a vertex lighting stage, a texturing stage, and display stage.

9. The method of claim 8, wherein each of said stages in the CPU and GPU pipeline are executed in series.

10. The method of claim 1, wherein stages in the processing pipeline are executed in parallel or in a time-sliced fashion and an amount of queuing storage is used between stages of processor pipeline.

11. Non-transitory computer readable media having program instructions that when executed assist in reducing bottlenecks in a processor pipeline, the computer readable media comprising:
program instructions for identifying a bottleneck stage within the processor pipeline processing frames of a video stream generated by program code of a video game being played by a user, the video game being executed by a server and said video stream is transmitted to a client computer, the bottleneck stage has a first clock;
program instructions for receiving a feedback signal from the bottleneck stage at an upstream stage, wherein the upstream stage has a second clock and the feedback signal includes information as to time spent by the bottleneck stage operating on data and information as to time the data spent queued; and
program instructions for adjusting a speed at which the upstream stage operates and queues data to approximate a speed at which the bottleneck stage is operating and queuing data, wherein each of the operations is performed by one or more hardware components of the server.

12. The non-transitory computer readable media of claim 11, wherein the processor pipeline includes one or more stages of central processor unit (CPU) processors and one or more stages of graphics processing unit (GPU) processors.

13. The non-transitory computer readable media of claim 12, wherein the one or more stages of CPU processors or the one or more stages of GPU processors are stages associated with the server, the server is defined by one or more servers, said servers being in a data center.

14. The non-transitory computer readable media of claim 11, wherein the first clock is in a first device and wherein the second clock is in a second device.

15. The non-transitory computer readable media of claim 14, wherein the first device and the second device are in different geographic locations associated with different data centers or in a same geographic location of a data center.

16. The non-transitory computer readable media of claim 11, wherein the processor pipeline includes one or more stages of central processor unit (CPU) processors and one or more stages of graphics processing unit (GPU) processors, and each of the CPU processors and GPU processors is defined by processing hardware.

17. The non-transitory computer readable media of claim 11,
   wherein the processor pipeline includes a CPU pipeline that includes at least an instruction fetch stage, and an execution stage;
   wherein the processor pipeline includes a GPU pipeline that includes at least a vertex lighting stage, a texturing stage, and display stage, and said stages in the CPU and GPU pipeline are executed in series.

18. The non-transitory computer readable media of claim 11, wherein stages in the processing pipeline are executed in parallel or in a time-sliced fashion and an amount of queuing storage is used between stages of processor pipeline.

\* \* \* \* \*